United States Patent
Long et al.

(10) Patent No.: US 12,445,727 B2
(45) Date of Patent: Oct. 14, 2025

(54) ACOUSTIC EAVESDROPPING USING A SMARTPHONE CAMERA

(71) Applicants: THE REGENTS OF THE UNIVERSITY OF MICHIGAN, Ann Arbor, MI (US); UNIVERSITY OF FLORIDA RESEARCH FOUNDATION, INC., Gainesville, FL (US)

(72) Inventors: Yan Long, Ann Arbor, MI (US); Kevin Fu, Ann Arbor, MI (US); Kevin Butler, Gainesville, FL (US); Sara Rampazzi, Gainesville, FL (US); Pirouz Naghavi, Gainesville, FL (US)

(73) Assignees: THE REGENTS OF THE UNIVERSITY OF MICHIGAN, Ann Arbor, MI (US); UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 127 days.

(21) Appl. No.: 18/488,444

(22) Filed: Oct. 17, 2023

(65) Prior Publication Data
US 2024/0187735 A1 Jun. 6, 2024

Related U.S. Application Data

(60) Provisional application No. 63/418,076, filed on Oct. 21, 2022.

(51) Int. Cl.
H04N 23/68 (2023.01)
G10L 17/04 (2013.01)
(Continued)

(52) U.S. Cl.
CPC .......... *H04N 23/687* (2023.01); *G10L 17/04* (2013.01); *G10L 17/26* (2013.01); *H04N 23/611* (2023.01);
(Continued)

(58) Field of Classification Search
CPC .............. H04N 23/687; H04N 23/611; H04N 23/6811; H04N 23/6812; H04N 23/689;
(Continued)

(56) References Cited

U.S. PATENT DOCUMENTS 9,521,365 B2 12/2016 Pratt et al.
10,129,658 B2 11/2018 Rubinstein et al.
(Continued)

OTHER PUBLICATIONS

Chhatre et al., "Review of Different Applications Using Visual Vibration Analysis", 2020, 2020 IEEE International Conference on Convergence to Digital World—Quo Vadis (ICCDW 2020) (Year: 2020).*
(Continued)

*Primary Examiner* — Albert H Cutler
(74) *Attorney, Agent, or Firm* — Harness, Dickey & Pierce, P.L.C.

(57) ABSTRACT

Rolling shutter and movable lens structures widely found in smartphone cameras modulate structure-borne sounds onto camera images, creating a point-of-view optical-acoustic side channel for acoustic eavesdropping. The movement of smartphone camera hardware leaks acoustic information because images unwittingly modulate ambient sound as imperceptible distortions. Experiments have found that the side channel is further amplified by intrinsic behaviors of complementary metal-oxide-semiconductor (CMOS) rolling shutters and movable lenses such as in optical image stabilization (OIS) and auto focus (AF). This disclosure characterizes the limits of acoustic information leakage caused by structure-borne sound that perturbs the point-of-view of (Continued)

smartphone cameras. In contrast with traditional optical-acoustic eavesdropping on vibrating objects, this side channel requires no line of sight and no object within the camera's field of view.

16 Claims, 8 Drawing Sheets

(51) Int. Cl.
  *G10L 17/26* (2013.01)
  *H04N 23/611* (2023.01)
(52) U.S. Cl.
  CPC ..... *H04N 23/6811* (2023.01); *H04N 23/6812* (2023.01); *H04N 23/689* (2023.01)
(58) Field of Classification Search
  CPC ....... G10L 17/04; G10L 17/26; G10L 15/005; G10L 15/24; G10L 17/02; G06V 40/16
  See application file for complete search history.

(56) References Cited

U.S. PATENT DOCUMENTS

| | | | | |
|---|---|---|---|---|
| 10,228,323 B1* | 3/2019 | Hart | ............... | G01N 21/1702 |
| 10,630,869 B1* | 4/2020 | Forsythe | ............... | G06T 7/254 |
| 11,122,373 B2 | 9/2021 | Jensen et al. | | |
| 2005/0220310 A1 | 10/2005 | McGrath | | |
| 2015/0153840 A1* | 6/2015 | March | ............... | H04N 23/6812 |
| | | | | 348/211.4 |
| 2020/0137309 A1* | 4/2020 | Kulik | ............... | H04N 23/6812 |
| 2021/0392268 A1* | 12/2021 | Jung | ............... | H04N 23/6811 |

OTHER PUBLICATIONS

Iwai et al., "Sound Quality Improvement of Extracted Sound from Video with Rolling-shuttered Camera", 2020, 2020 IEEE 9th Global Conference on Consumer Electronics (GCCE) (Year: 2020).*
Davis, Abe et al., "The Visual Microphone: Passive Recovery Of Sound From Video", ACM Transaction on Graphics, vol. 33, No. 4, Article 79, Jul. 2014.
Zhang, Dashan et al., "Note: Sound recovery from video using SVD-based information extraction", Review of Scientific Instruments, 87, 086111 (2016).
Nassi, Ben et al., "Lamphone: Real-Time Passive Sound Recovery from Light Bulb Vibrations", Crypto ePrint Archive, Jun. 2020.
Shabani, Mohammad Amin et al., "Local Visual Microphones: Improved Sound Extraction from Silent Video", arXiv:1801.09436 [cs.CV], Jan. 2018.
Mim, Khatuna Zannat et al., "Extraction of Sound Signal from Tiny Vibrations in Motion Magnified Video Using Optical Flow", International Conference on Computer, Communication, Chemical, Materials and Electronic Engineering (IC4ME2), Jul. 11-12, 2019.
Akutsu, Mariko et al., "Extract voice information using high-speed camera", Proceedings of Meetings on Acoustics, vol. 19, 2013.
Shindo, Hiroki et al., "Noise-reducing sound capture based on exposure-time of still camera", Proceedings of the 23rd International Congress on Acoustics, Sep. 2019.

* cited by examiner

ACOUSTIC EAVESDROPPING USING A SMARTPHONE CAMERA

CROSS-REFERENCE TO RELATED APPLICATIONS

This application claims the benefit of U.S. Provisional Application No. 63/418,076, filed on Oct. 21, 2022. The entire disclosure of the above application is incorporated herein by reference.

FIELD

The present disclosure relates to acoustic eavesdropping using cameras.

BACKGROUND

Smartphones and Internet of Things (IoT) cameras are increasingly omnipresent near sensitive conversations even in private spaces. This disclosure introduces the problem of how to prevent extraction of acoustic information that is unwittingly modulated onto image streams from smartphone cameras. The analysis centers on a discovered point-of-view (POV) optical-acoustic side channel that leverages unmodified smartphone camera hardware to recover acoustic information from compromised image streams. The side channel requires access to an image stream from a camera whose lens is near the eavesdropped acoustic source emitting structure-borne sound waves. The key technical challenge is how to characterize the limit of partial acoustic information leakage from humanly imperceptible image distortions, which is made possible by nearly universal movable lens hardware and CMOS rolling shutters that are sensitive to camera vibrations.

The most related body of research on optical-acoustic side channels involves recording videos of vibrating objects within the field of view with specialized, high-frame rate cameras. However, innovations in privacy-aware camera systems and software can actively detect and hide sensitive objects in camera images to prevent such direct data leakage. In contrast, this disclosure explores the optical-acoustic side channel intrinsic to existing camera hardware itself, eliminating the need of objects in the field of view or line of sight: an image stream of a ceiling suffices. That is, one can extract acoustic information from the vibratory behavior of the built-in camera—rather than the behavior of a vibrating object within the field of view of a specially mounted camera.

This section provides background information related to the present disclosure which is not necessarily prior art.

SUMMARY

This section provides a general summary of the disclosure, and is not a comprehensive disclosure of its full scope or all of its features.

A method is presented for identifying a speaker using a camera in a mobile device. The method includes: capturing a series of images of a scene with a camera, where a lens of the camera is free to move in relation to an image sensor of the camera; extracting data indicative of sound spoken by a speaker, where the sound impinges on the camera and the data is extracted from the series of images; and identifying an attribute of the speaker using the extracted data. Attributes of the speaker may include but are not limited to gender of the speaker, language of the speaker, and identity of the speaker In one embodiment, data indicative of sound spoken by a speaker is extracted by designating one of the images in the series of images as a reference image; and computing displacement values for pixels forming images in the series of images, where the displacement values are computed in relation to corresponding pixels in the reference image. Additionally, the attribute of the speaker may be identified by classifying the extracted data using machine learning.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
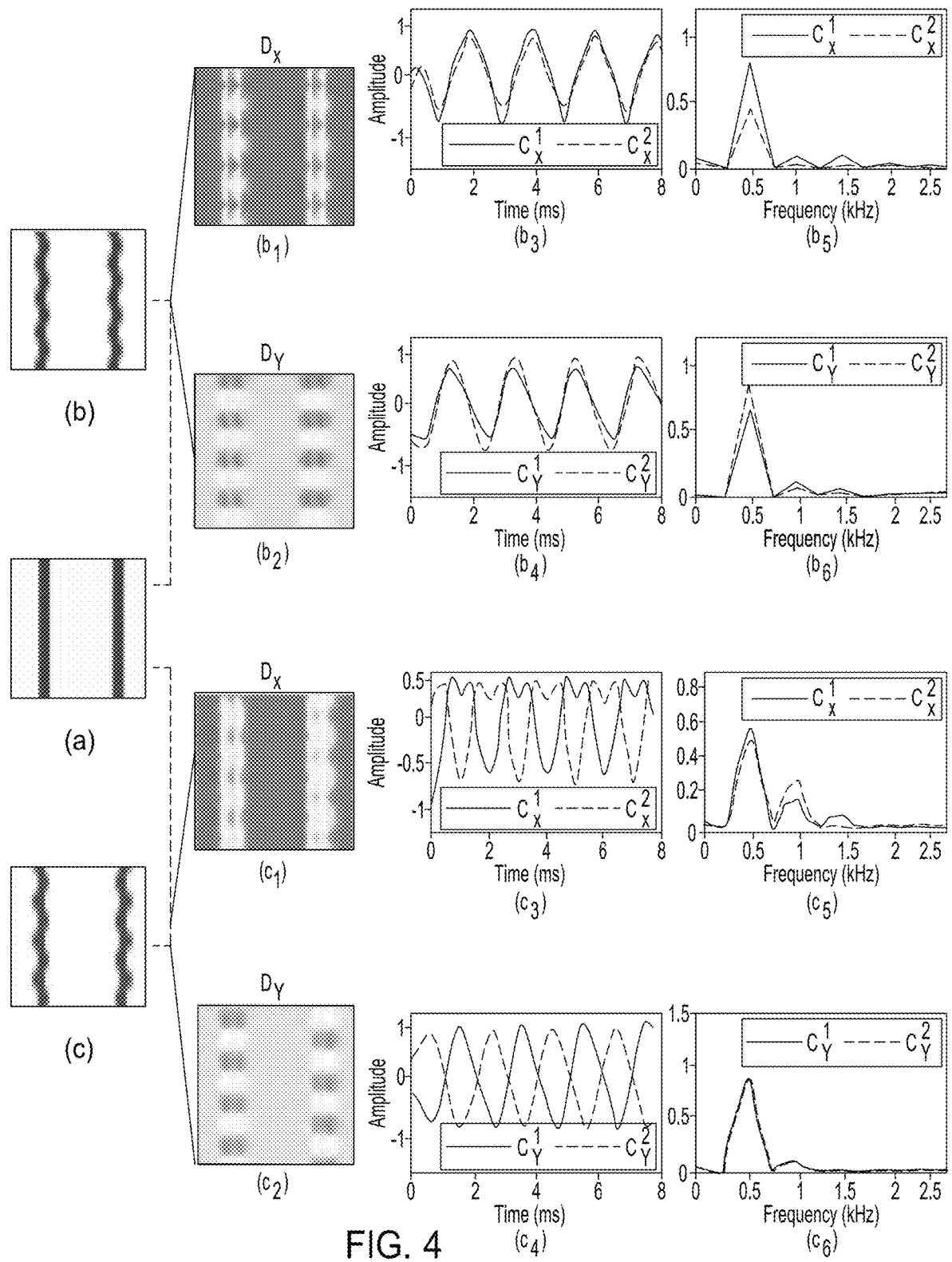

FIG. 4 shows the simulated rolling shutter images under 500 Hz sound wave and the extracted signals with diffused-based image registration, where (a) is the original scene; (b, c) are scenes with X and Z-axis motions respectively; (b/c1,2) are the X and Y direction displacement fields; (b/c3,4) are the time domain signals computed from displacement fields with column-wise channels; and (b/c5,6) are the corresponding frequency domain signals.

Figure 5:
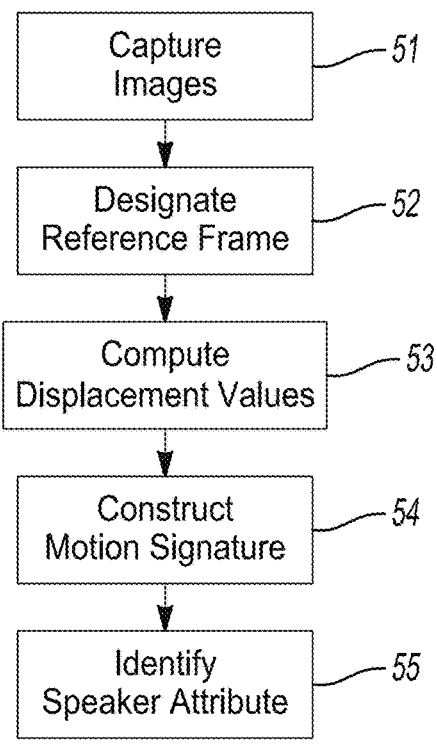

FIG. 5 is a flowchart depicting a method for identifying a speaker using a camera in a mobile device.

Figure 6A:
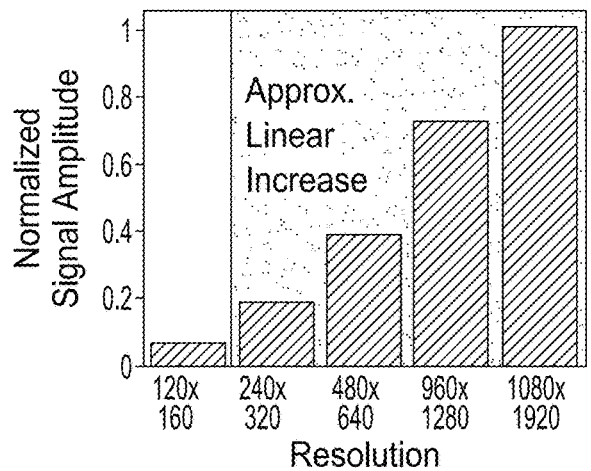
Figure 6B:
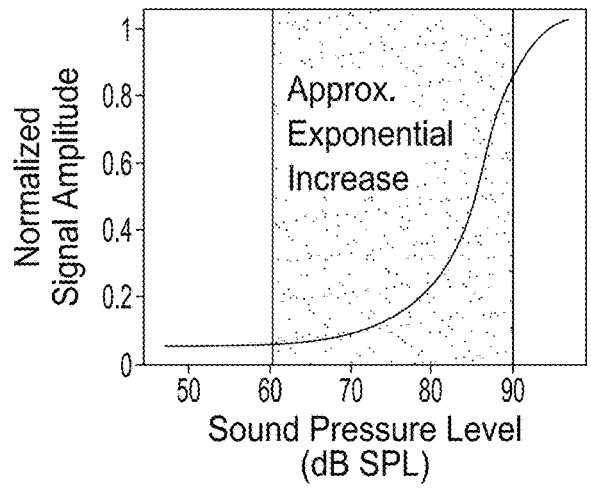
Figure 6C:
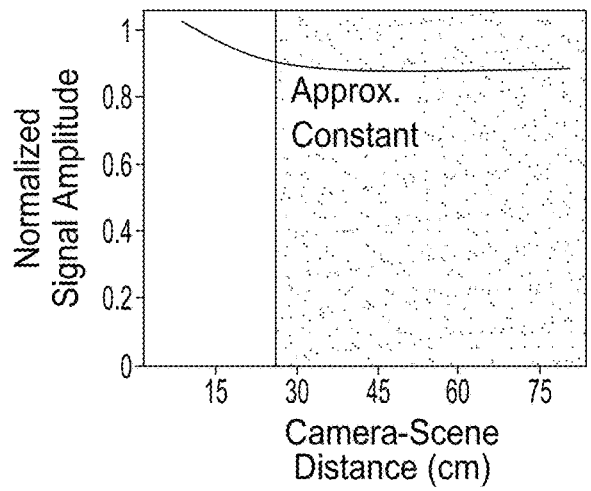

FIGS. 6A-6C are graphs showing the relationship between signal amplitude and different factors.

Figure 7A:
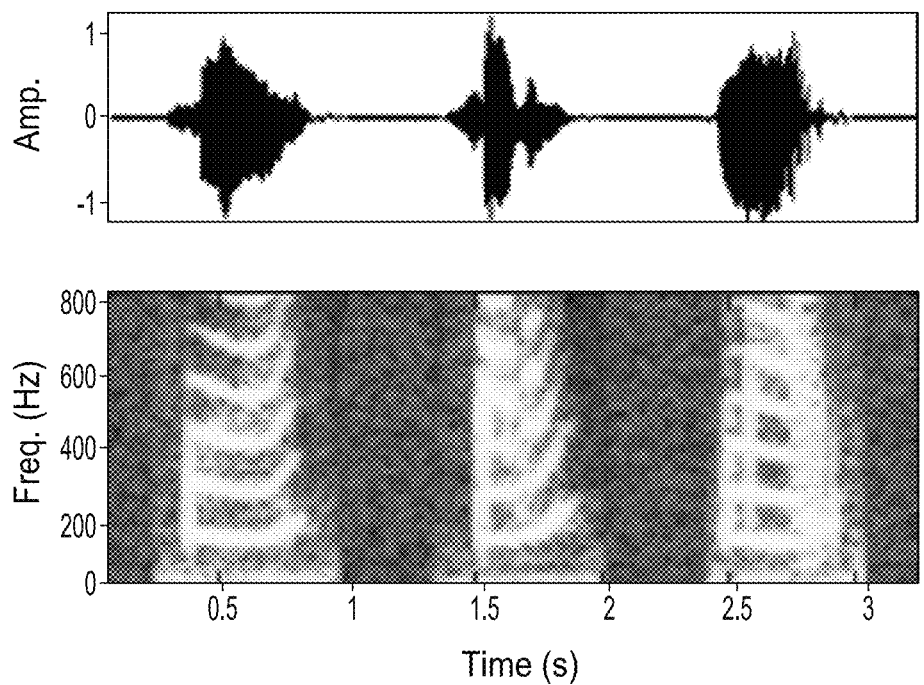
Figure 7B:
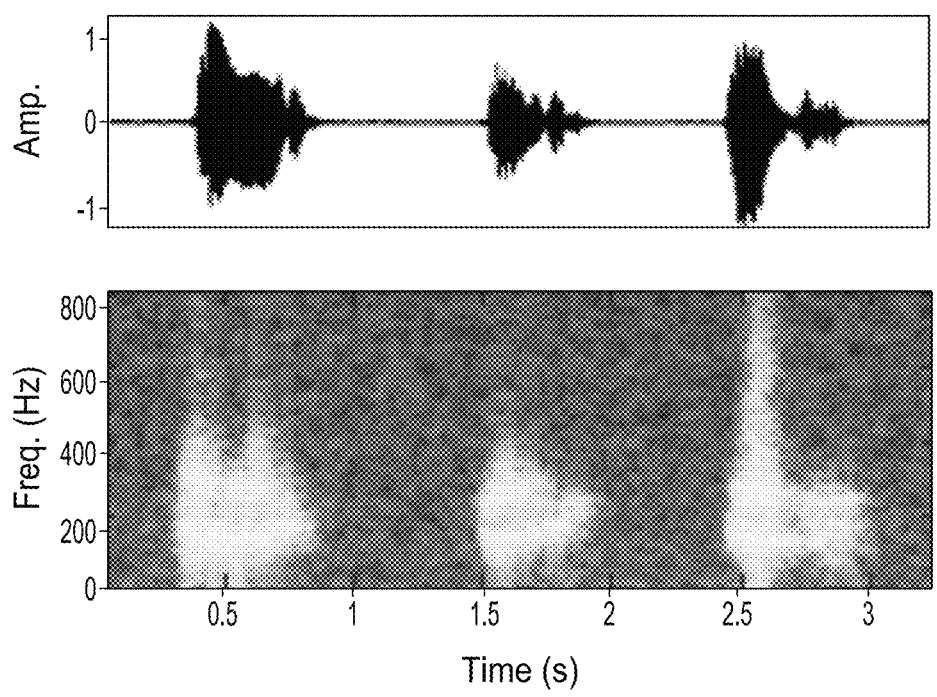

FIGS. 7A and 7B are waveforms and spectrograms of spoken digits in an original signal and a recovered signal, respectively.

Figure 8:
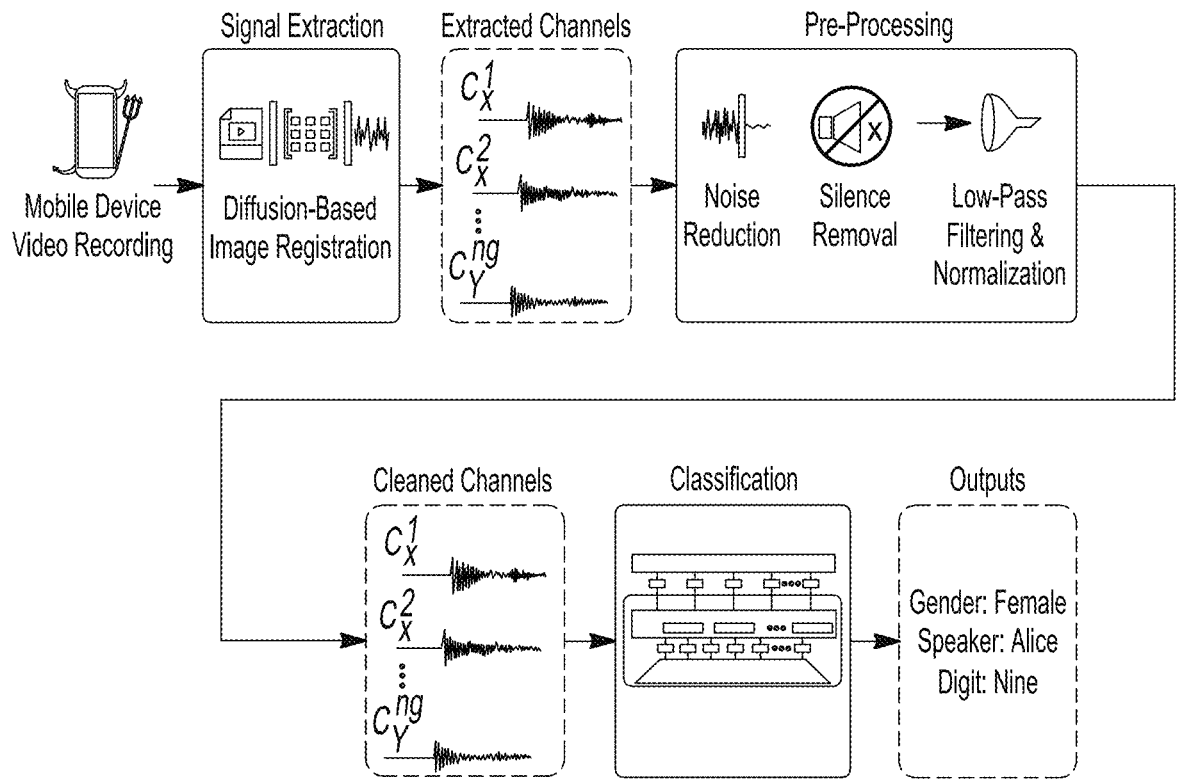

FIG. 8 is a diagram showing an example signal processing pipeline.

FIGS. 9A-9F are images of recovered chirp signals with different camera control parameters and a 30 fps frame rate.

Figure 10:
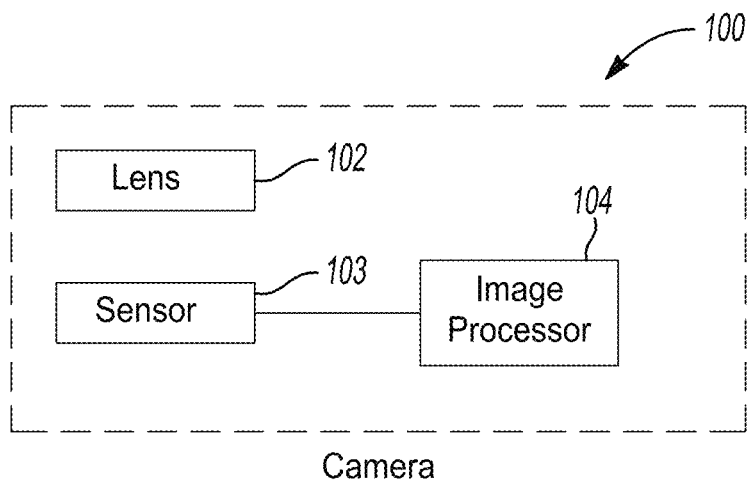

FIG. 10 is an apparatus for acoustic eavesdropping on a speaker using a camera.

Corresponding reference numerals indicate corresponding parts throughout the several views of the drawings.

DETAILED DESCRIPTION

Example embodiments will now be described more fully with reference to the accompanying drawings.

Figure 1A:
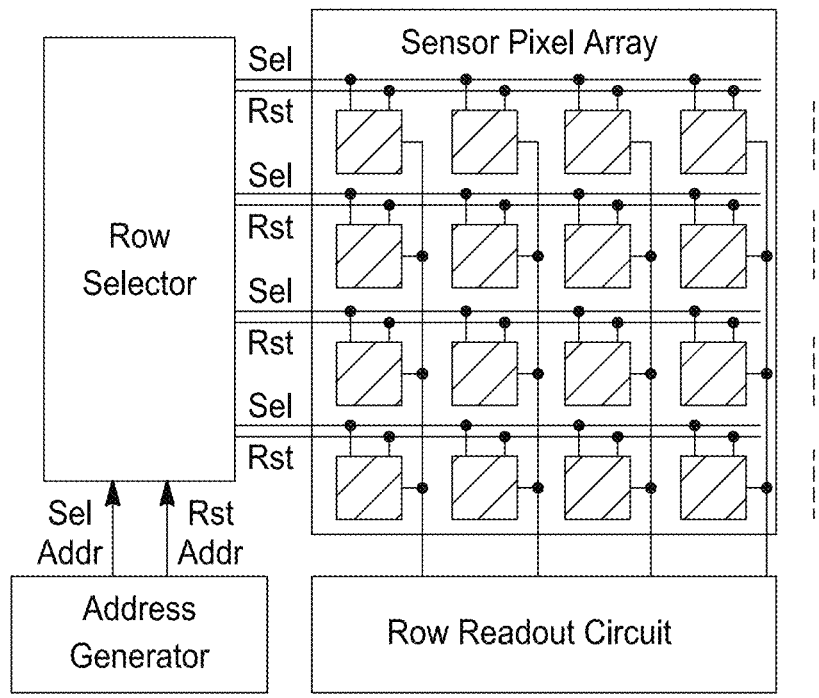
FIG. 1A is a diagram showing a CMOS rolling shutter camera's row-wise sampling architecture with a 4×4 sensor pixel array.
Figure 1B:
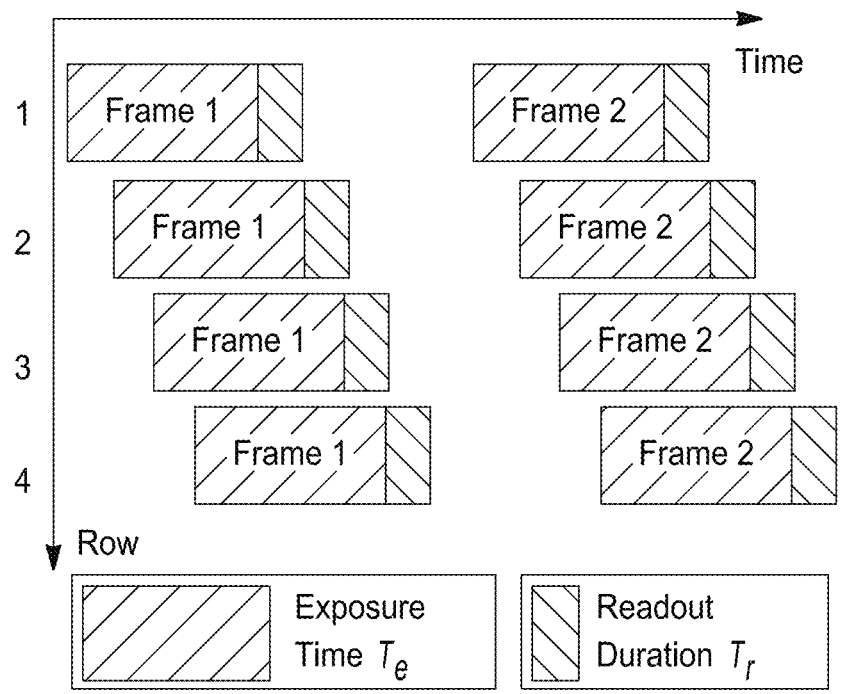
FIG. 1B is a diagram showing the sequential read out of rows for two consecutive frames with exposure time and row readout duration.

With reference to FIG. 1A, rolling shutter cameras, which feature a row-wise sampling architecture, dominate the market of portable electronics including smartphones. Row-wise sampling overlaps the exposure of one row with the read-out of subsequent rows as seen in FIG. 1B. An address generator controls this process by generating row-reset (RST) and row-select (SEL) signals that starts the exposure and read-out of each row respectively. The interval between the two signals is the exposure time $T_e$. The duration of each row's read-out is denoted as $T_r$. The row-wise sampling architecture comes at the cost of additional image distortions when the optical paths change while imaging a scene. The optical paths can change when a relative movement happens between the scene, the lens, and the pixel array. The rolling shutter distortions are thus a function of optical path variations.

While the CMOS photo-sensitive pixel array is mounted on printed circuit boards (PCB) and rigidly connected to the camera body, the lens in most modern CMOS cameras is flexibly connected to the camera body by suspension.

Figure 2:
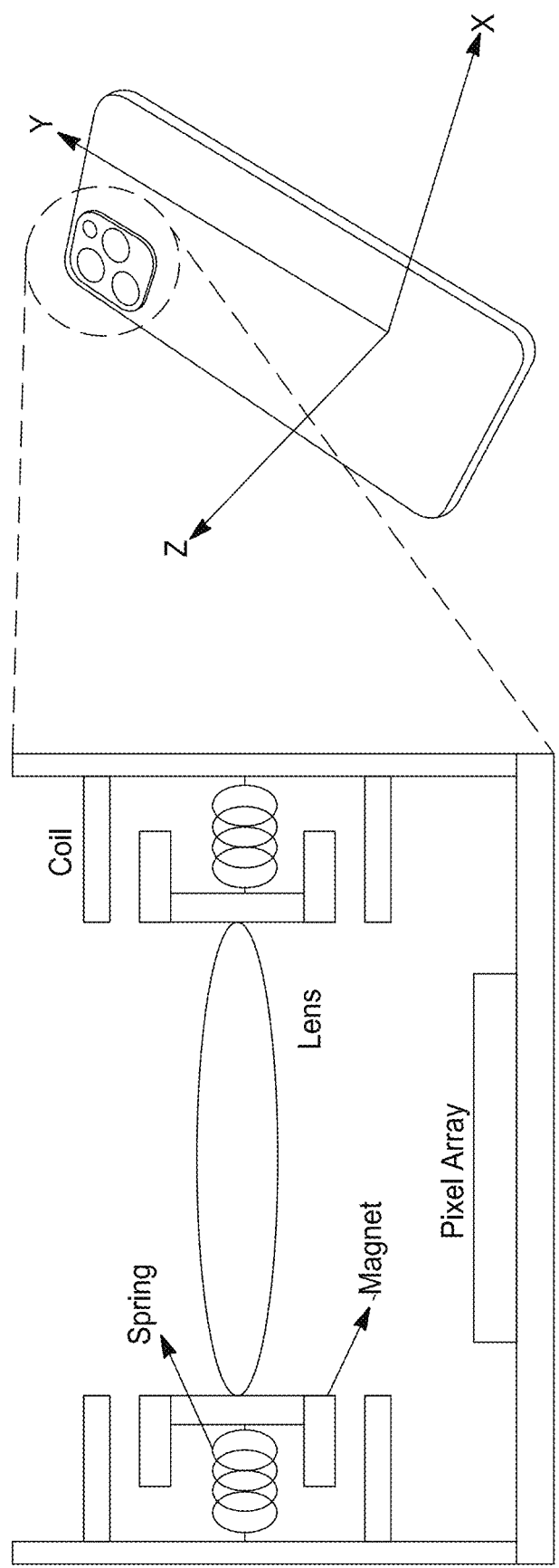
FIG. 2 is a diagram showing a movable lens structure of a camera with optical image stabilization and auto-focus.

Structures using springs and specialized wires. Such suspension structures allow relative movement between the lens and the pixel array, as shown in FIG. 2. The movable lens is an essential component of cameras' optical image stabilization (OIS) and auto-focus (AF) systems and is almost ubiquitous in hand-held camera devices including smartphone cameras.

OIS is an image stabilization method for mitigating tremor-caused motion blurs. Most OIS systems allow for 2D movements of the lens that are parallel to the pixel array plane, resulting in translational transformation of images. 2-DoF OIS movements are considered and such movements are termed as XY-axes movements. OIS lens stroke is typically on the order of 100 µm.

Most AF systems support 1-DoF movements of the lens on the axis that is perpendicular to the pixel array plane, which is termed as Z-axis movements. Such movements can induce zooming effects that can be viewed as scaling transformations of the 2D image. AF lens stroke is also on the order of 100 µm.

This disclosure investigates the consequences of movable lenses vibrated by structure-borne sound waves. Sound waves can propagate both through air by inducing movements of air molecules, and through structures by inducing mechanical deformations in them. Structure-borne propagation can often transmit much higher sound energy than air-borne propagation.

For problem formulation, the threat of POV acoustic information leakage into smartphone cameras is characterized through structure-borne sound propagation. The sound generated by a sound source in the vicinity of a camera propagates to the camera and vibrates it, inducing rolling shutter effects in the camera image stream. The rolling shutter pattern thus becomes a function of the acoustic signal. The objective of an adversary is to learn the reverse mapping from the rolling shutter pattern to the privacy-sensitive information in the acoustic signal. Formally, define the eavesdropping attack that an adversary A launches as a function $f_A$:

$$f_A: \{Pv(S^l(t), \mathbb{E}), \mathbb{E}_A\} \to \hat{l}, \hat{l} \in \mathbb{L}$$

where $S^l(t)$ is the continuous-time acoustic signal generated by the sound source; $l$, $\hat{l} \in \mathbb{L}$ are the true and estimated information label of the acoustic signal; $\mathbb{L}$ the set of all possible information labels and is reasonably assumed to be finite; $\mathbb{E}$, $\mathbb{E}_A$ are the sets of environmental factors that are present during the attack (e.g., phone-speaker distance) and that are controlled or known by the adversary respectively, and have $\mathbb{E} \supseteq \mathbb{E}_A$; $Pv(\cdot)$ denotes the projection from the acoustic signal to the videos containing the rolling shutter pattern. To measure the threat, define the advantage of an adversary over random-guess adversaries as a probability margin $$Adv_A = \mathbb{P}[f_A(Pv(S^l(t), \mathbb{E}), \mathbb{E}_A) - l < \epsilon] - \frac{1}{|L|} \quad (1)$$

where ε is an arbitrarily small number. A successful attack is defined as $Adv_A > 0$. Although $Adv_A$ is a theoretical value that requires knowing the probability distributions and functions in Equation 1 to calculate, one can estimate this value by obtaining classification accuracies on datasets with equally likely labels as further described below.

This disclosure focuses on recovering information from human speech signals broadcast by electronic speakers, as this is one of the most widely investigated threat models validated by previous research. In particular, this disclosure investigates the feasibility and limit of recovering acoustic information from smartphone camera without requiring microphone access. To better assess the limit, the adversary is allowed to utilize state-of-the-art signal processing and machine learning techniques. Three types of information recovery are discussed with increasing difficulty, namely (1) inferring the human speaker's gender, (2) inferring the speaker's identity, and (3) inferring the speech contents.

An adversary is in the form of a malicious app on the smartphone that has access to the camera but cannot access audio input from microphones. In common mobile platforms, including Android and iOS, the app will have full control over the camera imaging parameters, such as focus and exposure controls, once the camera access is granted. An adversary can change these parameters for optimal acoustic signal recovery based on their knowledge of the signal modulation process. Assume the adversary captures a video with the victim's camera while the acoustic signal is being broadcast. Further assume the adversary can acquire speech samples of the target human speakers beforehand to learn the reverse mapping to the targeted functions of the original speech signals and they can perform this learning process offline in a lab environment, which have been the standard assumptions in related side-channel research.

Sounds broadcast by an electronic speaker can reach a smartphone's camera through structure-borne propagation when there exists a propagation path consisting of a single structure or a system of structures such as tables, floors, and even human body. The malicious app eavesdrops acoustic information under the general user expectation that no information can be stolen through sound when the smartphone microphone access is disabled. Although camera access is usually regarded as being on the same privacy level as microphone access, users aware of the risk of acoustic leakage through microphones are still likely to grant camera access to apps until they realize the existence of the optical-acoustic side channel. This may happen in three major situations. First, the malicious app requests only camera access without microphone usage in the first place. Apps can disguise themselves as hardware information checking utilities (e.g., the widely used "AIDA64" app) or silent video recording apps that do not record any audio. Second, the malicious app requests both camera and microphone access but a cautious user only grants camera access. Filming apps (e.g., the "Open Camera" and "Mideo") often simply record without audio when microphone access is not granted. Third, the malicious app requests and is granted both camera and microphone access, but a user physically disables the microphone input by using external gadgets such as the Miclock microphone blocker. Additionally, malicious apps can record videos stealthily without camera preview or in the background as has been done by existing apps like the "Background Video Recorder" on the Google Play Store and "SP Camera" on the Apple App Store.

When the electronic speaker on a table plays audio with total kinetic energy $E_s$, part of the kinetic energy it generates $k_0 E_s$ propagates to the body of the phone in the form of structure-borne sound waves and vibrates the smartphone body. Specifically, longitude waves mainly cause XY-axes motions of the smartphone body while transverse and bending waves mainly cause Z-axis motions. The smartphone body and the camera body, including the sensor pixel array, are rigidly connected and thus have the same motion amplitude and velocity. Viewing them as a single unit separated from the camera lens, one can denote the kinetic energy causing vibrations of this unit as $E_p$. One can approximately model this unit's motions on the table as a spring-mass system with a spring constant $c_p$ and motion amplitude $A_p$. The camera lens is connected to the camera body through springs and can thus be regarded as a second spring-mass system. A portion of $E_p$, denoted as $k_1 E_p$, is converted to its elastic potential energy by stretching/compressing the springs. Denote the effective spring constant of the lens suspension system as $c_l$ and the relative motion amplitude between the lens and the smartphone-camera unit as $A_l (A_l < A_p)$, then $$k_0 E_s = E_p = \frac{1}{2} c_p A_p^2 = \frac{1}{k1} \frac{1}{2} c_l A_l^2 \quad (2)$$

Note that $k_0$, $k_1$ are frequency-dependent and reflect the physical properties of the mechanical system consisting of the speaker, the table, and the phone. In other words, $A_p$ and $A_l$ can be expanded along the frequency axis to represent the frequency response (transfer function) of the mechanical subpath. Such frequency response is hard to model but can be measured in an end-to-end manner.

Figure 3A:
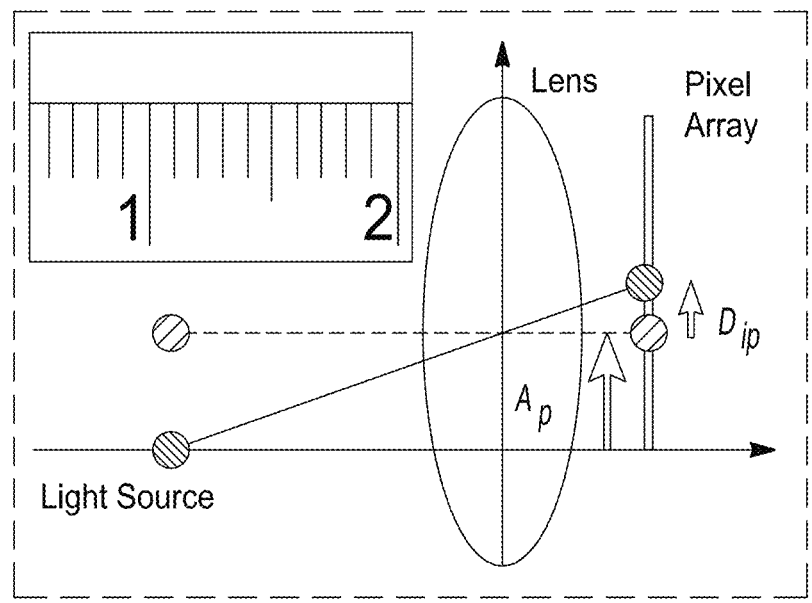
FIGS. 3A and 3B illustrate a movable lens structure acting as a signal amplifier when structure-borne sound vibrates the camera, where the dotted and solid lines represent the light ray projected before and after vibration, respectively.
Figure 3B:
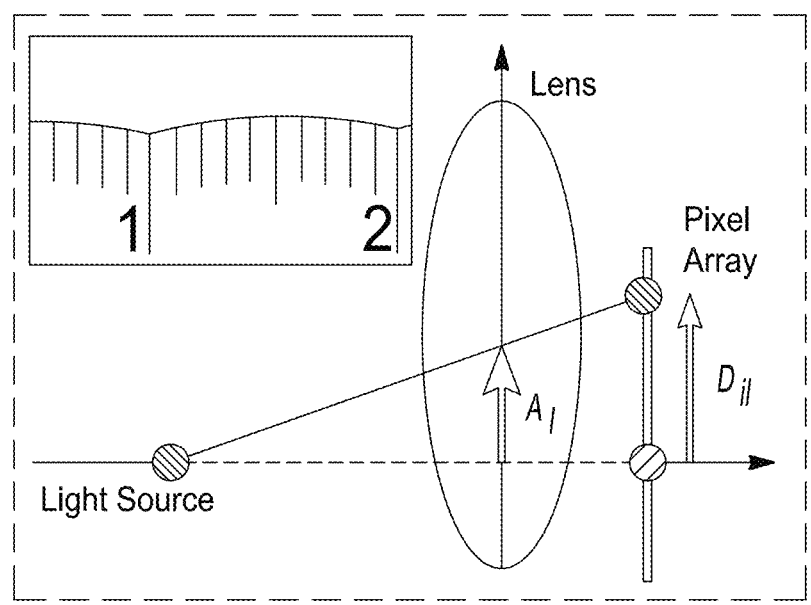

The movements of the smartphone body and the lens change the optical paths in different ways. FIGS. 3A and 3B show a simplified model of how the two types of movements on the X-axis affect the light ray from a still point source to the sensor pixel array. In FIG. 3A, the smartphone-camera body unit moves by $A_p$ while there exists no relative movement between it and the lens. With a focal length of $f$ (on the order of 5 mm²) and a camera-scene distance of d; the light ray projection point on the pixel array shifts by $$\frac{f}{d} A_p.$$

In FIG. 3B, only the lens is moving by $A_l$ while the smartphone-camera unit stays still. In this case, the projection point shifts by $$\left(1 + \frac{f}{d}\right) A_l.$$

The optical projections are then sampled by the photosensitive pixel array and converted to digital signals, with the shifts of the projection point converted to pixel displacements in the images. Denoting the general pixel displacement as $D_i$, the two types of movements will then result in pixel displacements of $$D_{ip} = \frac{f}{d} \frac{Ap}{H} P \text{ and } D_{il} = \left(1 + \frac{f}{d}\right) \frac{Al}{H} P,$$

where H and P are the physical size and pixel resolution of the sensor pixel array on the X-axis, respectively. An interesting question arises as to whether $D_{ip}$ or $D_{il}$ is the main enabling factor of this side channel. Note that $f/d$ is very small since the camera-scene distance is usually larger than 10 cm. In light of this, one can hypothesize flu is the dominant factor assuming $A_p$ and $A_l$, which cannot be measured directly, are on the same order of magnitude. The hypothesis is verified experimentally by recording videos while preventing and allowing lens movements using a magnet. FIG. 4 shows the significantly higher pixel displacement magnitudes when the lens is free to move under a 200 Hz sound wave. With a small distance d of 10 cm, observe $D_{ip} < 1$ px and $D_{il} \approx 8$ px, which translates to $A_p < 63$ μm and $A_l \approx 22$ μm. Thus ascertain that the lens movement is the main cause of the noticeable pixel displacements in the images. In other words, the movable lenses act as motion signal amplifiers compared to those cameras that can only move with the smartphone body. In light of this finding, the displacement is modeled as a function of the lens movement as $$D_i \approx D_{il} = \left(1 + \frac{f}{d}\right) \frac{Al}{H} P \quad (3)$$

As pointed out above, multi-DoF motions of the lens will mainly cause translation and scaling 2D transformations in the image domain. With a rolling shutter, transformations caused by multiple motions will be combined into one image frame because of the row-wise sampling scheme, and consequently produce wobble patterns that can be viewed as the outcome of modulating vibration signals onto the image rows. Furthermore, motion blurs exist due to the finite (namely, not infinitely small) exposure time of each row. For example, FIG. 4 shows the simulated rolling shutter image (250×250) with an exposure time of 1 ms when 500 Hz sinusoidal motion signals on the X and Z axis are modulated onto the original image. In light of these observations, the limits of the acoustic signal recovery are modeled.

The imaging process of each row in a frame is modeled as a linear process where the final (row) image is the summation of different views that are 2D transformations of the original/initial view within the exposure time. The summation is actually the accumulation of photons on the CMOS imaging sensors. Consider frames of size M rows, N columns and the simplest case where the motion only results in a uni-axis translation transformation on the column direction (X axis). Denote the i-th row of the initial view as a column vector r(i), and the matrix formed by all the possible translated views of r(i) as Ri=[ ... $r^{j-1}(i)$ $r^j(i)$ $r^{j+1}(i)$ ... ]. Theoretically, $R_i$ has infinite number of columns as the translation is spatially continuous. Considering a more practical discretized model, let j correspond to the displacement value in pixels in the image domain. For example, $r^{-3}(i)$ denotes the view shifted to the reverse direction along X-axis by 3 pixels. Allowing negative indexing to $R_i$ for convenience and discretizing the continuous physical time with small steps of δ, the formation of the i-th row in the k-th image frame, which is denoted as r̃(k, i), can then be expressed as the summation of different columns of $R_i$:

$$\begin{cases} \tilde{r}(k, i) = \sum_{n=n_{k,i}^{start}}^{n \le n_{k,i}^{end}} Ri[:, s(n\delta)] \\ n = n_{k,i}^{start} = \dfrac{T_f^k + (i-1)Tr}{\delta} \\ n \le n_{k,i}^{end} = \dfrac{T_f^k + (i-1)Tr + Te}{\delta} \end{cases} \quad (4)$$

where $T_f^k$ denotes the imaging start time of the frame and $s(n\delta)$ denotes the discrete motion signal with amplitude $D_i$ (Eq. 3) in the image domain. Equation 4 shows how rolling shutter exposure modulates the signal onto the images' rows. The objective of the adversary is to recover $s(n\delta)$ from r̃(k, i).

With the modeling above, one can compute the characteristics of the recoverable signals. Signals in time intervals $[n_{k,m}^{end}\delta, n_{k=1,l}^{start}\delta]$ i.e., the gap between different frames, cannot be recovered since no camera exposure happens then. This portion is termed as the "lost signal" and the remaining portion as the "captured signal". One can calculate the percentage of the captured signal $$\eta_{cap} = f_v M T_r \quad (5)$$

where $f_v$ is the video frame rate. Higher $\eta_{cap}$ means the adversary can recover more information from images.

For the captured signal, although the adversary wants to infer all the transformed views and thus recover all signals in time intervals $[n_{k,i}^{start}\delta, n_{k,i}^{end}\delta]$, it is impossible to know the order of these views' appearance because the photons from all the views are summed in the exposure time and the loss of order information is irreversible. Without the order information, the adversary can only reformulate Equation 4 as $$\begin{cases} \tilde{r}(k, i) = R_i x(i) \\ x(i)_j = \sum_{n=n_{k,i}^{start}}^{n \le n_{k,i}^{end}} I_{\{s(n\delta) == j\}} \end{cases} \quad (6)$$

where x(i) is a coefficient column vector whose j-th entry $x(i)_j$ represents how many times the translated view $r^j(i)$ appeared within the exposure time; $I\{\bullet\}$ is the indicator function. Theoretically, with the measurable final image r̃(k, i) and the matrix $R_i$ that can be approximately constructed using a still frame, x(i) can be computed by solving the linear system in Equation 6. To recover a 1D motion signal that is a function of s (nδ), the adversary can estimate a synthetic motion data point a(i) from x(i) by taking the weighted average of j with respect to x(i):

$$a(i) = \dfrac{\sum_j j \times c(i)_k}{\sum_j x(i)_j} = \dfrac{1}{Te/\delta} \sum_{n=n_{k,i}^{start}}^{n \le n_{k,i}^{end}} s(n\delta) \quad (7)$$

The adversary-measurable signal a(i) thus embeds the information of the original motion signal. Based on Equations 4 and 7, one can conclude that the measurable signals extracted from the rolling shutter patterns have an effective sample rate of $1/T_r$. Equation 7 also shows that the sampling process from a motion-blurred image acts as a moving mean filter whose frequency response is determined by the exposure time $T_e$.

Given this understanding of the side channel, a method is presented for identifying a speaker using a camera in a mobile device as described in relation to FIG. 5. As a starting point, a series of images of a scene are captured at 51 by a camera, where a lens of the camera is free to move in relation to an image sensor of the camera. Although not necessary, the AF and OIS functions of the camera are preferably disabled to allow the lens to move freely.

Data indicative of sound spoken by a speaker is extracted by an image processor, where the sound impinges on the camera and the data is extracted from the series of images. Informed by the modeling above and practical computational constraints, a motion signal extraction algorithm is designed based on diffusion-based image registration.

In an example embodiment, one of the images in the series of images is designated at 52 as a reference image $I_{ref}$. Displacement values are then computed at 53 for the pixels forming a given image in relation to corresponding pixels in the reference image. For example, from a reference image $I_{ref}$ and a moving image $I_{mov}$ of size M×N, 2D displacement fields (matrices) for X and Y-direction displacements, respectively, are $$D_x^{M \times N} \text{ and } D_y^{M \times N}.$$

FIG. 4 shows the raw displacement fields in (b) and (c). From the displacement values, a motion signature for the lens of the camera can be constructed as indicated at 54. In one example, the raw displacement values serve as the motion signature.

In another example, displacement values may be averaged column wise and/or row wise. Applying column-wise averaging to the matrices reduces data dimensionality as well as the impact of random noise in the imaging process, which improves data robustness. To do so, assign columns to different groups and take group-wise average on the X and Y displacement fields, respectively. Empirically choose the number of groups $n_g$ to be the nearest integer to 2 N/M to balance the robustness and the details one wants to preserve. After averaging, reduce $D_X$ and $D_Y$ to 4 N/M 1 D signals of length M (number of rows), and term each 1D signal as a channel. Let dir∈ {A; Y} and $a^i$ denote the averaging column vector with its j-th entry denoted as $a_j^i$, the channels are then formally defined as $$\begin{cases} C_{dir}^i = D_{dir} \cdot a^i, \quad i = 1, 2, \ldots, n_g \\ a_j^i = \dfrac{N}{n_g} I\left\{\dfrac{n_g}{N}(i-1) < j \le \dfrac{n_g}{N}i\right\} \end{cases}$$

For the 250×250 images in FIG. 4, the four channels and their spectrums are shown in ($b_{3-6}$) and ($c_{3-6}$). When dealing with a video (i.e., a sequence of images) use the first frame as $I_{ref}$ and concatenate consecutive frames' channels to get the channel signals of the video. Use the same notation $C_{dir}^i$ to denote a video's channels. Other techniques for computing displacement values are also contemplated by this disclosure.

From the extracted data, an attribute of the speaker can be identified at 55 by the image processor. In the example embodiment, the attributes of the speaker are identified by classifying the motion signature using machine learning, such as a convolutional neural network or support vector machines. Attributes of the speaker may include but are not limited to gender of the speaker, language of the speaker, and identity of the speaker. The feasibility of this approach and a particular implementation are further described below.

Most smartphones have both front and rear cameras. Although some smartphone manufacturers, such as Vivo, have started to equip their front cameras with OIS, rear cameras are the focus of this work since more of them are equipped with OIS and AF. The rear camera has a certain scene while imaging. The scene can affect information recovery because their structures, textures, and distance from the camera can modify the characteristics of the light rays entering the camera. The scene changes with the smartphone's placement and location. For example, a phone on a table with an upward-facing rear camera often records a scene of the ceiling ("Ceiling Scene"); a downward-facing camera on a non-opaque surface such as a glass table often records a scene of the floor ("Floor Scene"). For simplicity, assume there are no moving objects in the scene. For a preliminary analysis, a test setup1 with a KRK Rokit 4 speaker and a Google Pixel 2 phone held by a flexible glass platform on a table with the phone's rear camera facing downwards is used to simulate a Floor Scene. A customized video recording app acts as the malicious app to record in MP4 format.

Figure 9A:
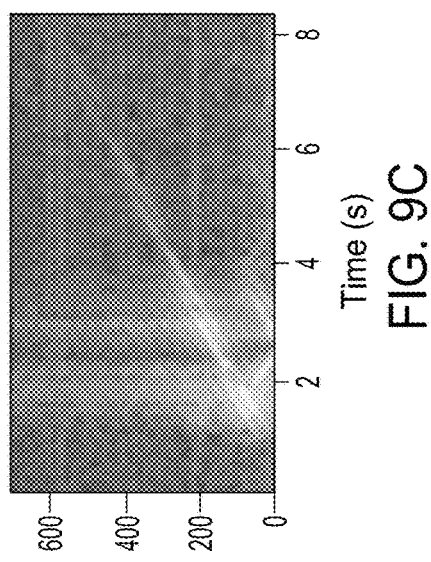
Figure 9B:
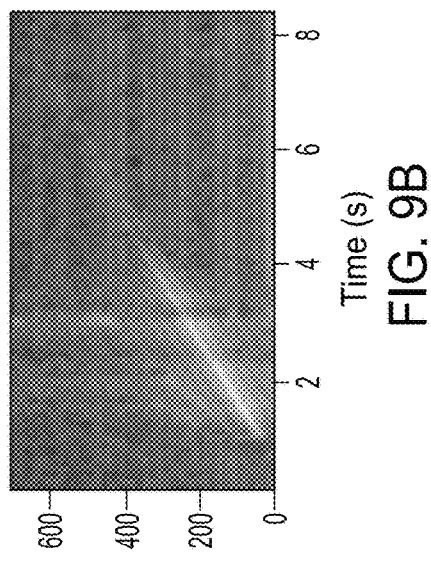
Figure 9C:
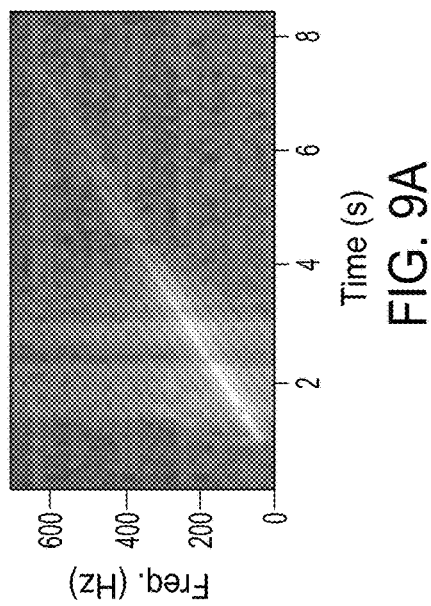
Figure 9D:
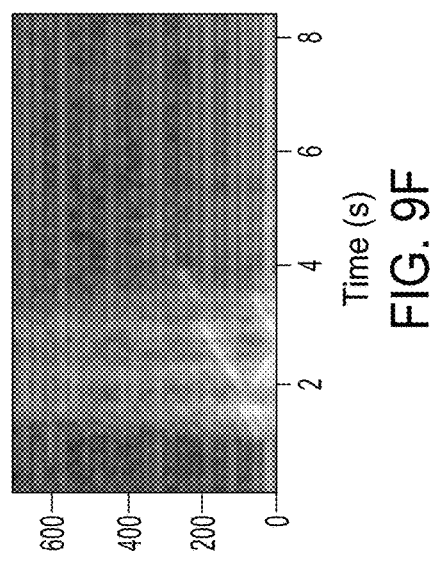
Figure 9E:
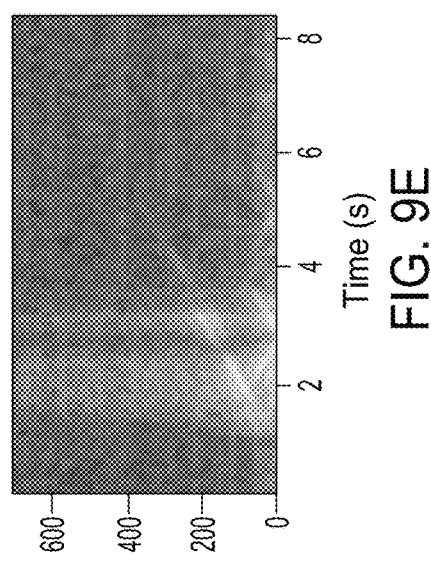
Figure 9F:
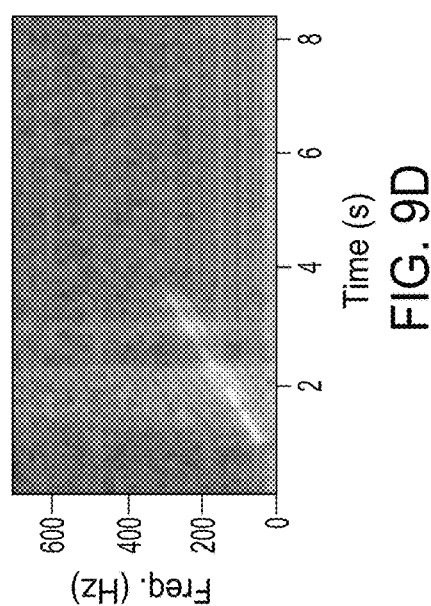

The frequency response of the side channel is determined by both the mechanical subpath and the camera control parameters of the malicious app that can be optimized by the adversary. Estimate the frequency response by conducting a frequency sweep test where audio of a chirp from 50 to 650 Hz is played. Then aim to find the optimum response for the Google Pixel 2. FIG. 9A shows the best response where the maximum recovered chirp frequency is about 600 Hz. Specifically, the control parameters are optimized in the following ways: (1) disable auto-exposure and reduce the exposure time; (2) disable optical and electronic image stabilization (OIS and EIS) and auto-focus (AF); (3) minimize video codec compression; (4) maximize pixel resolution; and (5) choose appropriate frame rates for each phone. FIGS. 9B-9F also show the responses when optimum settings are not achieved.

Variations of configuration factors can also affect the recoverable signals. Discussed next is the impact of three main factors: sound pressure, distance from the scene, and phone orientation. For sound pressure level, louder sounds induce larger signal amplitudes, i.e., $D_i$ in Equation 3, by increasing $E_p$ and thus $A_p$. FIG. 6B shows that discernible signals appear when the SPL is larger than 60 dB. The signal amplitude increases exponentially as the SPL increases until the lens motion approaches the stroke limit of the suspension system around 90 dB. Such an exponential relationship agrees with the modeling discussed above since the SPL is a logarithmic function of $E_p$ and $D_i \propto \sqrt{Ep}$. It suggests the attack might be relatively sensitive to changes in volumes. For camera-scene distance and according to Equation 3, the camera-scene distance d has progressively smaller impact on $D_i$ as it increases. FIG. 6C shows that the signal amplitude is approximately constant when the distance between the smartphone camera and the object in the scene is larger 30 cm. Considering that both Ceiling and Floor Scenes often have distances much larger than 30 cm, FIG. 6C suggests this factor has a relatively small impact on the attack capability. For phone orientation, the orientation (on the XY-plane) of the phone with respect to the sound source changes the lens motion directionality. How orientation can affect the attack is empirically evaluated by testing different orientations. It was found that phone orientation has a relatively small impact on the extractable acoustic information since most cameras' movable lenses have at least three degrees of freedom. The lens motions on all directions can thus be effectively captured. Besides the three factors above, other factors, such as the phone-speaker distance, affect the recovered signal in less quantifiable ways due to the lack of descriptive mathematical models.

FIGS. 7A and 7B show the original and recovered speech signals of a human speaking "one", "seven", and "nine". While one could detect clear tones and their dynamics with more than doubled recoverable frequency range compared to that of smartphone motion sensor side channels reported so far (about 250 Hz maximum), the recovered speech audio is still challenging for humans to recognize directly due to complex signal transformations. This suggests a human hearing system-based attack $f_A$ is not likely to succeed. Existing machine-based Speech-to-Text engines, such as Google Cloud, IBM Watson, and Apple voice assistant, were unable to detect speech in the recovered signals. This observation motivated the construction of a more specialized $f_A$ for estimating the information recovery limits.

FIG. 8 depicts an example implementation for a signal processing pipeline. The signal processing pipeline is comprised of three stages: signal extraction; pre-processing; and classification. In this example, the signal extraction stage implements the extraction algorithm described above. The pipeline accepts videos collected by the malicious app and outputs $2n_g$ (8 in the case of 1080p videos) channels of 1D signals.

For pre-processing, the pipeline performs noise reduction, liveness detection, trimming, low-pass filtering, and normalization to the channels. As shown in FIG. 9, the extracted signals contain non-trivial but spectral-static noise caused by different imaging and image registration noise. First apply a background noise reduction step using a spectral-subtraction noise removal method. Then conduct a channel-wise amplitude-based liveness detection that determines the start and end index of the contained speech signals. Afterwards, average the start and end indices of the channels and trim them to remove the parts without speech signals. Further apply a digital low pass filter with a cutoff frequency of 4 kHz to get rid of the remaining high-frequency disturbances caused by camera imaging noise. Finally, normalize the channels and pass them to the next stage.

For classification stage, a classification model is built upon the Hidden-unit Bidirectional Encoder Representations from Transformers (HuBERT). The HuBERT-based classification model utilizes the advantages of transfer learning, waveform input, and state-of-the-art performance. The model consists of three major components: CNN encoder, transformer, and classifier. To adopt the original HuBERT for the signal processing pipeline, the model is changed by (1) modifying the CNN encoder to allow multiple waveform channels, (2) changing the transformer dropout probability, and (3) adding a classification layer to allow HuBERT to be used for spoken digit classification. All of these changes are implemented while preserving as much of HuBERT's pre-training as possible to leverage the benefit of transfer learning. Preserving the pretrained weights is particularly important for the CNN encoder because it helps avoid the vanishing gradient problem that commonly occurs when training deep neural networks. The weights of the first layer for each channel of the input signal $C_x^1, \ldots, C_y^{ng}$ are used and the original dropout probability of 0.1 to 0.05 is changed to better regularize the model for this task. A classifier is added to process the output of the transformer. The classifier averages the nonmasked discovered hidden units and outputs label scores for each classification task. In the classification tasks, gender, digit, and speaker output 1, 10, and 20 scores, respectively, which are used to obtain the likelihood of each label and thus the final predicted class.

To gauge the general capability of the optical-acoustic side channel, evaluations were carried out on a spoken digit dataset used in previous work of smartphone motion sensors acoustic side channel. First evaluate the structure-borne side channel's performance in shared-surface and different-surface scenarios separately using a Google Pixel 2 to investigate the impact of different structures and structure organizations, and then compare the performance between different phone models. For evaluation metrics, provide both common speech audio quality metrics including NIST-SNR and Short-Time Objective Intelligibility (STOI) and accuracies of the specialized classification model. The former measures how good the extracted audio signals are; whereas, the latter measures how well information labels are extracted from audio signals to quantify the limits of information recovery. The two systems of metrics generally agree with each other as one observes correlation scores of 0.72 and 0.80 between the model's digit classification accuracies and NIST-SNR and STOI, respectively, with the evaluation data.

The dataset is a subset of the AudioMNIST dataset and contains 10,000 samples of signal-digit utterances (digit 0-9) from 10 males and 10 females. Three classification tasks were performed, namely speaker gender recognition, speaker identity recognition, and speaker independent digit recognition. These three tasks correspond to the three levels of information recovery with $|\mathbb{L}|=2, 20, 10$, respectively. Since all data labels for each task are equally likely in the dataset, the classification accuracies then serve as a statistical indication of $Adv_A$.

As a baseline setup, the smartphones and a KRK Classic 5 speaker are placed side by side on a glass desk (Floor Scene), as shown in FIG. 11A. The speaker volume measures 85 dB SPL at 1 m. The impact of smaller volumes including normal conversation volumes will be discussed below. For each evaluation case, collect the whole 10 k samples in our dataset using Python automation. Randomize the order of collected samples to avoid biased results due to unknown temporal factors. All phones use an exposure time of 1 ms.

To train the HuBERT large model for classification, randomly split the 10 k sample dataset into training, validation, and test sets with 70%, 15%, and 15% splits, respectively. For each device or scenario evaluation, train three HuBERT large models, one for each classification task. All the models were trained from the original pre-trained HuBERT large to allow for better comparison and used the same test set for final evaluation of all the models. The validation set is used for hyperparameter tuning and final model selection. During training, the model with the highest Receiver Operating Characteristic Area Under Curve (ROC-AUC) score is selected as the final model.

NIST-SNR (referred to as SNR hereafter) measures the speech-to-noise ratio by calculating the logarithmic ratio between the estimated speech signal power and the noise power. A higher SNR score indicates better signal quality. STOI is a widely used intelligibility metric. A higher STOI score indicates the speech audio is more comprehensible to humans. For all evaluation cases, measure the SNR and STOI over the 1536-sample test set to make it comparable to the classification accuracies reported. Also utilize SNR and STOI to measure signal quality in certain test cases that do not present a unique evaluation dimension by using a 100-sample signal testing subset. Then report the average SNR and STOI scores of all involved samples.

Shared-surface scenarios include the phones and speakers on the same surface, usually a table. In different scenarios, the quality of the recovered signals varies with configuration changes as shown below. First study the impact of camera scenes and speaker volumes individually, and then investigate several representative scenarios that incorporate different combinations of the key factors of surface structure and phone-speaker distance.

Table I shows the classification results under three scenes as shown in FIG. 10. The first scene (Floor Scene 1) is with a downward-facing camera on the glass desk imaging the floor covered by a carpet. The second scene (Floor Scene 2) uses the same table and downward facing camera but contains a different carpet on the floor. The third scene (Ceiling Scene) is with the camera upward-facing on the same table imaging the ceiling. Floor Scene 1 produces the highest accuracies in all three classification tasks, which is due to the following reasons. First, the carpet of Floor Scene 1 has lighter color than the carpet in Floor Scene 2, enabling more photons to be reflected and enter the camera and thus increasing the signal to noise ratio. Second, the image scene of Floor Scene 1 has larger contrast than that of Ceiling Scene due to the more abundant textures of the carpet compared to the ceiling.

TABLE 1

Performance In Shared-surface Scenarios

| Scenario | Case | Avg. SNR | Avg. STOI | G (%) | S(%) | D(%) |
|---|---|---|---|---|---|---|
| Scene | Floor Scene 1 | 18 | 0.51 | 99.87 | 91.02 | 79.69 |
| | Floor Scene 2 | 13 | 0.48 | 99.54 | 83.85 | 70.05 |
| | Ceiling Scene | 9 | 0.38 | 99.87 | 86.27 | 67.64 |
| Volume | 85 dB | 18 | 0.51 | 99.87 | 91.02 | 79.69 |
| | 75 dB | 11 | 0.44 | 99.80 | 89.13 | 76.95 |
| | 65 dB | 4 | 0.18 | 98.83 | 76.11 | 68.16 |
| | 55 dB | 2.4 | 0.13 | 80.27 | 34.77 | 27.67 |
| | 45 dB | 2.3 | 0.15 | 54.49 | 8.92 | 13.28 |
| | 35 dB | 2.3 | 0.14 | 54.23 | 6.84 | 15.95 |
| Glass Desk, Distance, Volume | 10 cm, 85 dB | 9 | 0.38 | 99.87 | 86.27 | 67.64 |
| | 10 cm, 65 dB | 1.9 | 0.25 | 81.25 | 37.17 | 32.03 |
| | 110 cm, 85 dB | 9.3 | 0.35 | 99.74 | 84.24 | 64.13 |
| | 110 cm, 65 dB | 1.8 | 0.32 | 81.12 | 36 | 31.12 |
| Wooden Desk, Distance, Volume | 10 cm, 85 dB | 4.4 | 0.19 | 98.37 | 73.11 | 57.55 |
| | 10 cm, 65 dB | 1.8 | 0.25 | 60.29 | 13.22 | 17.25 |
| | 130 cm, 85 dB | 5.2 | 0.22 | 99.48 | 83.59 | 69.53 |
| | 130 cm, 65 dB | 1.8 | 0.21 | 75.2 | 30.08 | 28.26 |
| Wooden CR TBL, Distance, Volume | 10 cm, 85 dB | 8.8 | 0.33 | 99.02 | 79.82 | 66.6 |
| | 10 cm, 65 dB | 2.4 | 0.19 | 76.76 | 42.58 | 32.49 |
| | 200 cm, 65 dB | 2.3 | 0.19 | 70.75 | 33.53 | 26.43 |
| | 300 cm, 65 dB | 2.6 | 0.19 | 83.2 | 41.86 | 30.99 |

TBL—Table,
CR—Conference room,
G—Gender,
S—Speaker,
D—Digit

Different speaker volumes represent different daily scenarios. FIG. 6B shows that the speaker volume has a strong impact on the signal amplitude. It was found, however, the sharp decrease in signal amplitude does not lead to proportional decrease in the classification accuracies. Table I shows the result with four typical conversation volumes and two whisper/background volumes: 85, 75, 65, 55, 45, and 35 dB often represent shouting, loud conversation, normal conversation, quiet conversation, whisper, and background noise, respectively. The results indicate that for volumes of 55 dB and above, the $f_A$ designed still has significant advantage over a random-guess adversary, demonstrating the side channel's effectiveness in quiet conversation volumes. The accuracies appear to be in the random-guess range at 45 and 35 dB.

Besides the glass desk, a wood desk was evaluated in the same office along with a 3 m-long wooden conference room table. The Ceiling Scene was used for this set of evaluation. Table I shows the results with two different distances on the wooden and glass desks at 85 and 65 dB. The first distance is 10 cm and represents the scenario of placing the phone right beside the speaker; the other distance is the maximum achievable distance on each table (110 and 130 cm) by placing the phone on one edge and the speaker on the other edge. With the glass desk, a 3% decrease was observed for digit recognition when the distance increases from 10 cm to 110 cm. For the wooden table, the accuracies increased when the distance increased from 10 cm to 130 cm. Although this may seem counterintuitive at first, a closer look at the desks' mechanical structures suggests it is due to the smaller effective thickness on the edge of the table. At 65 dB, the glass and wooden desks show larger drops in accuracies than those in the volume experiments, which is due to the ceiling scene having a more uniform color spectrum compared to Floor Scene 1, making smaller vibration amplitudes a more significant factor on classifier performance. To further evaluate the side channel's robustness with larger phone-speaker distances, experiments were conducted with a 3 m-long wooden conference room table. As shown in Table I, the classifiers' accuracies remain larger than random-guess accuracies, indicating the side channel's effectiveness at distances larger than 100 cm at normal conversation volumes.

To uncover the potential impact of speaker devices on the side channel, four different speaker devices were tested including two standalone speakers (KRK Classic 5 and Logitech Z213), a laptop speaker (Acer Laptop G9-593), and a smartphone speaker (Samsung S20+). Table II shows that all four speaker devices allow for performance better than a random guess adversary. It was found even smaller internal speakers of portable devices including the laptop speaker vibrating a nearby phone's camera and the Samsung S20+∝s speaker vibrating its own on-board camera could induce discernible signals. The variation in accuracies over the 4 devices is mainly due to the different maximum output volumes they can achieve; while the KRK Classic 5 and the Logitech Z213 speakers can output 85 and 75 dB, respectively, the Laptop G9-593 and Samsung S20+ speakers are limited to 60 dB output.

TABLE 2

Performance With Different Speaker Devices

| Speaker Device | Avg. SNR | Avg. STOI | Gender (%) | Speaker (%) | Digit (%) |
|---|---|---|---|---|---|
| KRK Classic 5 | 18 | 0.51 | 99.87 | 91.02 | 79.69 |
| Logitech Z213 | 18 | 0.44 | 99.09 | 88.8 | 77.67 |
| Laptop G9-593 | 3.3 | 0.12 | 94.92 | 57.03 | 36.78 |
| Samsung S20+ | 6.4 | 0.15 | 89.00 | 53.91 | 32.36 |

Thus far, most experiments were conducted with the speaker and the phone as the only objects present on the surface. Theoretically, presence of additional objects on the surfaces propagating sound waves will only have a small impact on the side channel because structure-borne sound vibrates the entire structures which are often much heavier than the objects on the surfaces. To further investigate this factor, experiments were conducted with a daily occurring scenario of cluttered desk with a varying set of common objects placed on the desk including a speaker, a laptop, a monitor, and a printer. Despite the slight change in SNR and STOI scores (Table VI), full evaluations of the least and most cluttered scenarios reported similar classification accuracies: the least cluttered scenario achieved 94.86%, 70.44%, and 50.98% for gender, speaker, and digit classification accuracy respectively while the most cluttered desk scenario achieved 91.41%, 69.27%, and 56.25%. The results suggest cluttered surfaces with heavy objects allow for similar side channel performance.

Several different-surface scenarios were evaluated including (1) the speaker on the desk and the phone on the desk's monitor stand; (2) the speaker on the floor and the phone in the pocket of a shirt and a backpack worn by a mannequin; (3) the speaker and phone on different desks; and (4) the speaker and phone in separate rooms. Table III indicates the side channel's performance over random-guess adversary in these scenarios. With the exception of monitor stand experiments, the decrease in performance can be attributed to the fact that the same speaker energy $E_s$ now vibrates structures of much larger weight and stiffness (in this case the concrete floor) as opposed to a wooden floor structure or wooden/glass surface. This makes it more difficult to create oscillation of structures with larger amplitudes to produce higher SNR. Additional cause of performance degradation could be due to the contact point between the desk and mannequin's foot, and transfer medium, i.e., the floor, moving relative to each other and causing frictional losses of the vibration energy $E_s$ and thus also result in a lower SNR.

TABLE 3

Performance In Different-surface Scenarios

| Scenario | Avg. SNR | Avg. STOI | G (%) | S (%) | D (%) |
|---|---|---|---|---|---|
| Monitor Stand 85 dB | 11 | 0.45 | 99.09 | 80.53 | 60.42 |
| Monitor Stand 65 dB | 2.6 | 0.09 | 84.05 | 42.32 | 32.1 |
| Two Desks 85 dB | 2.6 | 0.08 | 75.72 | 19.6 | 14.26 |
| Two Rooms 85 dB | 2.3 | 0.06 | 66.93 | 15.17 | 15.17 |
| Shirt Pocket 85 dB | 2.5 | 0.19 | 95.9 | 66.37 | 45.7 |
| Bag Pocket 85 dB | 4.1 | 0.23 | 93.1 | 40.1 | 55.34 |

G—Gender,
S—Speaker,
D—Digit

To evaluate the capability and robustness of the side channel on different phones, the classification accuracies of 10 phones were analyzed in the Floor Scene 1 setup. Table IV shows the results from three smartphone families, namely the Google Pixel, Samsung Galaxy, and Apple iPhone. To measure the key characteristics, a 200 Hz tone is generated for three seconds. Then find $1/T_r$ by changing it to align the recovered signal with 200 Hz. With $1/T_r$ calculate $\eta_{cap}$ according to Equation 5. Further measure $\eta_{cap}$ by dividing the length of the recovered tone by 3 seconds. The measured and calculated $\eta_{cap}$ match well with each other which shows the correctness of our modeling. 30 fps was used for the Android phones because that is what most Android manufacturers currently provide to 3rd party apps while iPhone used 60 fps.

As shown in Table IV, the Google Pixel phones generate the highest accuracies for all three classification tasks. The iPhones generate slightly better results than Samsung phones. Samsung S8+ generated the worst accuracies. Note that the videos of Samsung S8+ suffer from missing frames potentially due to internal processing issues. Observe that $\eta_{cap}$ has the strongest correlation where lower $\eta_{cap}$ provides the adversary with less information and consequently lower accuracies. Also note that there exists a trend of newer camera modules having lower $T_r$, i.e., higher rolling shutter frequency, and thus lower $\eta_{cap}$. All the phones tested achieved at least 99.22%, 76.56%, and 61.07% accuracies on gender, speaker, and digit recognition, respectively. This suggests that the adversary is able to perform successful side channel attacks with high $Adv_A$ (Section III) on a large portion of phones available on the market.

TABLE 4

Performance With Different Smartphone Models

| Device | Avg. SNR | Avg. STOI | Gender (%) | Speaker (%) | Digit (%) |
|---|---|---|---|---|---|
| Pixel 1 | 18 | 0.46 | 99.61 | 81.84 | 69.53 |
| Pixel 2 | 18 | 0.51 | 99.87 | 91.02 | 79.69 |
| Pixel 3 | 17 | 0.49 | 99.67 | 91.28 | 80.66 |
| Pixel 5 | 22 | 0.49 | 99.48 | 84.51 | 70.25 |
| Samsung S7 | 21 | 0.49 | 99.54 | 82.94 | 66.08 |
| Samsung S8+ | 17 | 0.45 | 99.61 | 79.30 | 57.29 |
| Samsung S20+ | 22 | 0.49 | 99.80 | 83.92 | 61.07 |
| iPhone 7 | 28 | 0.53 | 99.87 | 85.09 | 65.23 |
| iPhone 8+ | 26 | 0.50 | 99.41 | 81.64 | 66.67 |
| iPhone 12 Pro | 28 | 0.52 | 99.22 | 76.56 | 62.30 |

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of an image processor, a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

With reference to FIG. 10, the present disclosure also relates to an apparatus 100 for performing the operations herein. The apparatus 100 is comprised of: a lens 102, an image sensor 103 and an image processor 104. Of note, the lens 102 is free to move in relation to the image sensor 103 while capturing images. Although not limited thereto, the lens 102 and image sensor 103 are preferably part of a camera. The image processor 104 be also be integrated in the camera or reside outside the camera, for example in a second device.

In an exemplary embodiment, the image processor 104 is implemented as a microcontroller. It should be understood that the logic for the image processor 104 can be implemented in hardware logic, software logic, or a combination of hardware and software logic. In this regard, image processor 104 can be or can include any of a digital signal processor (DSP), microprocessor, microcontroller, or other programmable device which are programmed with software implementing the above described methods. It should be understood that alternatively the image processor 104 is or includes other logic devices, such as a Field Programmable Gate Array (FPGA), a complex programmable logic device (CPLD), or application specific integrated circuit (ASIC). It is further understood that only the relevant components of the camera and/or the apparatus are discussed in relation to FIG. 10, but that other components may be needed to control and manage the overall operation of the system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for identifying a speaker using a camera in a mobile device, comprising:
   capturing, by the camera, a series of images of a scene, where a lens of the camera is free to move in relation to an image sensor of the camera;
   designating one of the images in the series of images as a reference image;
   extracting, by an image processor, data indicative of sound spoken by a speaker by computing displacement values for a subset of pixels forming images in the series of images in relation to corresponding pixels in the reference image, where the sound impinges on the camera and the subset of pixels are arbitrarily selected from the pixels forming the images; and
   identifying, by the image processor, an attribute of the speaker using the extracted data.

2. The method of claim 1 further comprises enabling movement of the lens of the camera in relation to the image sensor before capturing the series of images.

3. The method of claim 2 further comprises computing displacement values for pixels using image registration.

4. The method of claim 1 wherein identifying an attribute of the speaker further comprises classifying the extracted data using machine learning.

5. The method of claim 1 wherein the attribute of the speaker is selected from a group consisting of gender of the speaker, language of the speaker, and identity of the speaker.

6. A method for acoustic eavesdropping on a speaker using a camera in a mobile device, comprising:
   capturing, by the camera, a series of images of a scene, where a lens of the camera is free to move in relation to an image sensor of the camera;
   designating, by an image processor, one of the images in the series of images as a reference image;
   computing, by the image processor, displacement values of a subset of pixels forming images in the series of images, where the subset of pixels are arbitrarily selected from the pixels forming the images and the displacement values are computed in relation to corresponding pixels in the reference image;

constructing, by the image processor, a motion signature for the lens of the camera from the computed displacement values; and determining, by the image processor, an attribute of the speaker by classifying the motion signature using machine learning.

7. The method of claim 6 further comprises computing displacement values of pixels for each image in the series of images using image registration by generating, for each image in the series of images, a first two dimensional matrix of values for displacement along one axis of the image sensor and a second two dimensional matrix of values for displacement along the other axis of the image sensor.

8. The method of claim 7 wherein constructing a motion signature further comprises column wise averaging values of the first two dimensional matrix and the second two dimensional matrix.

9. The method of claim 6 further comprises classifying the motion signature using a transformer.

10. The method of claim 6 wherein classifying the motion signature further comprises determining an attribute of the speaker, where the attribute is selected from a group consisting of gender of the speaker, language of the speaker, and identity of the speaker.

11. The method of claim 6 wherein classifying the motion signature further comprises determining content of speech spoken by the speaker.

12. A non-transitory computer-readable medium having computer-executable instructions that, upon execution of the instructions by a processor of a device, cause the device to:

capture a series of images of a scene by a camera, where a lens of the camera is free to move in relation to an image sensor of the camera;

designating one of the images in the series of images as a reference image;

extracting data indicative of sound spoken by a speaker by computing displacement values for a subset of pixels forming images in the series of images in relation to corresponding pixels in the reference image, where the sound impinges on the camera and the subset of pixels are arbitrarily selected from the pixels forming the images; and identify an attribute of the speaker using the extracted data.

13. The non-transitory computer-readable medium of claim 12 wherein the computer program instructions further perform to designate one of the images in the series of images as a reference image; and compute displacement values for pixels forming images in the series of images, where the displacement values are computed in relation to corresponding pixels in the reference image.

14. The non-transitory computer-readable medium of claim 13 wherein the computer program instructions further perform to compute displacement values for pixels using image registration.

15. The non-transitory computer-readable medium of claim 12 wherein the computer program instructions further perform to identify an attribute of the speaker by classifying the extracted data using machine learning.

16. The non-transitory computer-readable medium of claim 12 wherein the attribute of the speaker is selected from a group consisting of gender of the speaker, language of the speaker, and identity of the speaker.

* * * * *